(12) United States Patent
Kubota

(10) Patent No.: US 9,806,539 B2
(45) Date of Patent: Oct. 31, 2017

(54) POWER SUPPLY DEVICE AND POWER TRANSMISSION UNIT FOR POWER SUPPLY DEVICE

(71) Applicant: NISSAN MOTOR CO., LTD., Yokohama-shi, Kanagawa (JP)

(72) Inventor: Satoshi Kubota, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/780,342

(22) PCT Filed: Mar. 18, 2014

(86) PCT No.: PCT/JP2014/057272
§ 371 (c)(1),
(2) Date: Sep. 25, 2015

(87) PCT Pub. No.: WO2014/156811
PCT Pub. Date: Oct. 2, 2014

(65) Prior Publication Data
US 2016/0087449 A1    Mar. 24, 2016

(30) Foreign Application Priority Data
Mar. 29, 2013  (JP) ................................. 2013-071225

(51) Int. Cl.
*H02J 5/00*        (2016.01)
*B60L 11/18*       (2006.01)
(Continued)

(52) U.S. Cl.
CPC ............... *H02J 5/005* (2013.01); *B60L 11/18* (2013.01); *B60L 11/182* (2013.01);
(Continued)

(58) Field of Classification Search
CPC ............................. B60L 11/182; B60L 11/18
See application file for complete search history.

(56) References Cited

U.S. PATENT DOCUMENTS 5,661,391 A * 8/1997 Ito .......................... B60L 11/182
                                                       320/108
5,703,461 A * 12/1997 Minoshima ........... B60L 11/182
                                                       320/108
(Continued)

FOREIGN PATENT DOCUMENTS

JP    7-227007 A    8/1995
JP    H07227007 A  * 8/1995 .............. B60L 11/18
(Continued)

*Primary Examiner* — Thienvu Tran
*Assistant Examiner* — Pinping Sun
(74) *Attorney, Agent, or Firm* — Foley & Lardner LLP

(57) ABSTRACT

A power supply device of the present invention includes a power transmission unit (15) configured to wirelessly supply power to the power receiving unit (9). The power transmission unit (15) includes: a ground-side coil (13); and a housing (21) set on a ground (19) and configured to house the ground-side coil (13). The housing (21) includes: a coil section (25) in which to dispose the ground-side coil (13); and a first projection (29) disposed closer to a vehicle entry side than the ground-side coil (13) is, and projecting upward from a surface of the coil section (25).

11 Claims, 8 Drawing Sheets

(51) Int. Cl.
*H01M 10/46* (2006.01)
*H02J 17/00* (2006.01)

(52) U.S. Cl.
CPC ............ *H01M 10/46* (2013.01); *H02J 17/00* (2013.01); *H01M 2220/20* (2013.01)

(56) References Cited

U.S. PATENT DOCUMENTS

| | | | | |
|---|---|---|---|---|
| 5,710,502 | A * | 1/1998 | Poumey | B60L 11/182 320/108 |
| 5,821,731 | A | 10/1998 | Kuki et al. | |
| 5,850,135 | A | 12/1998 | Kuki et al. | |
| 6,150,794 | A * | 11/2000 | Yamada | B60L 11/007 320/107 |
| 6,525,510 | B1 * | 2/2003 | Ayano | B60L 3/00 320/108 |
| 7,003,836 | B2 * | 2/2006 | Berg | B66F 7/243 14/69.5 |
| 7,313,467 | B2 * | 12/2007 | Breed | G07C 5/008 307/9.1 |
| 8,248,028 | B2 * | 8/2012 | Toya | H02J 7/0027 320/107 |
| 2009/0174264 | A1 * | 7/2009 | Onishi | H02J 5/005 307/104 |
| 2009/0278523 | A1 * | 11/2009 | Yoda | H01F 38/14 323/318 |
| 2010/0290215 | A1 * | 11/2010 | Metcalf | A47B 21/00 362/127 |
| 2011/0181238 | A1 * | 7/2011 | Soar | B60N 2/24 320/108 |
| 2011/0204845 | A1 * | 8/2011 | Paparo | H01F 38/14 320/108 |
| 2012/0280649 | A1 * | 11/2012 | Jung | H02J 5/005 320/108 |
| 2013/0300202 | A1 * | 11/2013 | Keeling | H01F 27/022 307/104 |
| 2014/0084687 | A1 * | 3/2014 | Dent | H02M 1/32 307/26 |
| 2014/0139179 | A1 * | 5/2014 | Chen | H02J 7/025 320/108 |

FOREIGN PATENT DOCUMENTS

| | | | |
|---|---|---|---|
| JP | 9-213378 A | 8/1997 | |
| JP | 2002-70355 A | 3/2002 | |
| JP | 2002070355 A * | 8/2002 | ............ E01F 13/00 |
| JP | 2012-5243 A | 1/2012 | |
| JP | 2013-46492 A | 3/2013 | |
| WO | WO 2011/158107 A1 | 12/2011 | |
| WO | WO 2013/001812 A1 | 1/2013 | |

* cited by examiner

POWER SUPPLY DEVICE AND POWER TRANSMISSION UNIT FOR POWER SUPPLY DEVICE

TECHNICAL FIELD

The present invention relates to a power supply device configured to wirelessly supply power from a power transmission unit including a ground-side coil to a power receiving unit including a vehicle-side coil, and the power transmission unit for the power supply device.

BACKGROUND ART

A power supply device configured to wirelessly supply power from power transmission equipment set on a ground to power receiving equipment installed in an electric vehicle has been made publicly known (see Patent Literature 1). The power supply device makes a self-resonant coil on the power transmission side and a self-resonant coil on the power receiving side resonate with each other through an electromagnetic field, and thereby becomes capable of wirelessly supplying the power from the self-resonant coil on the power transmission side to the self-resonant coil on the power receiving side.

The power supply device described in Patent Literature 1 includes a power transmission unit including the self-resonant coil. The power transmission unit includes at least one side surface projecting upward from the ground, and an upper surface. This power supply device enhances accuracy with which the vehicle is stopped in the power transmission equipment by enhancing accuracy with which a vehicle-mounted camera recognizes the power transmission unit.

CITATION LIST

Patent Literature

Patent Literature 1: Japanese Patent Application Publication No. 2012-5243

SUMMARY OF INVENTION

Technical Problem

Meanwhile, there is likelihood that while the electric vehicle is being moved in to the power transmission equipment, a tire of the vehicle runs onto a coil section of the power transmission unit set on the ground. Such a situation may damage the coil section of the power transmission unit.

With the problem taken into consideration, an object of the present invention is to inhibit a tire of the vehicle from running onto the coil section of the power transmission unit set on the ground.

Solution to Problem

The present invention is characterized in that: a power transmission unit includes a ground-side coil, and a housing set on a ground and configured to house the ground-side coil; and the housing includes a projection disposed closer to a vehicle entry side than the ground-side coil is, and projecting upward from a surface of a coil section in which to dispose the ground-side coil.

DESCRIPTION OF EMBODIMENTS

Based on the drawings, descriptions will be hereinbelow provided for an embodiment of the present invention.

Figure 1:
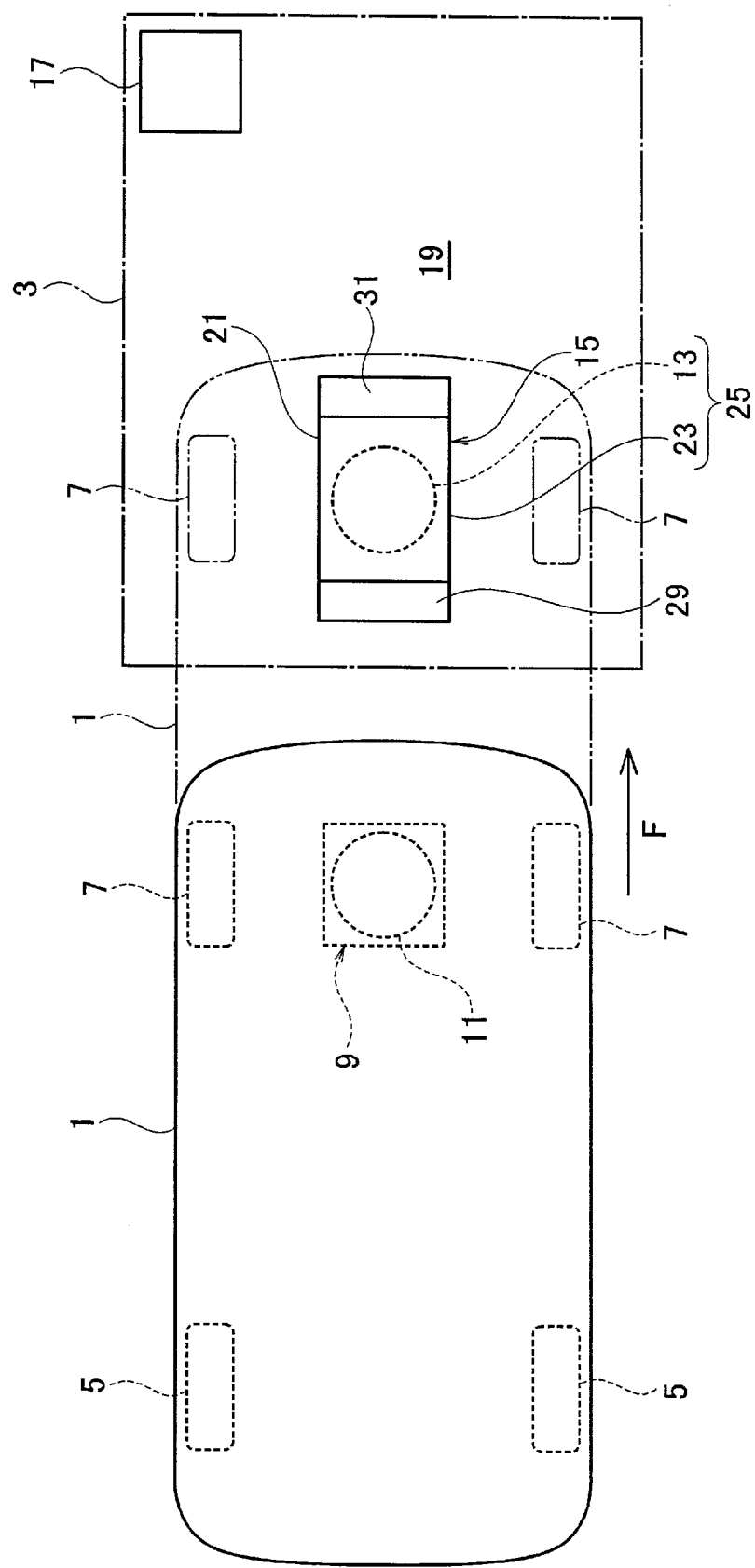
FIG. 1 is a plan view showing a positional relationship between an electric vehicle and power transmission equipment in an embodiment of the present invention.

As shown in FIG. 1, a wireless power supply device of an embodiment of the present invention transmits power (wirelessly supplies power) from power transmission equipment 3 to an electric vehicle 1 with the electric vehicle 1 stopped at a power receiving position indicated with a chain double-dashed line. The driver moves the electric vehicle 1, for example, from a position indicated with a solid line shown in FIG. 1 to the power transmission equipment 3 in a vehicle entry direction indicated with an arrow F, and stops the electric vehicle 1 at the power receiving position. It should be noted that the power transmission of the wireless power supply device may be achieved by using any one of electromagnetic induction, microwaves, and magnetic resonance.

The electric vehicle 1 includes front-wheel tires 5 and rear-wheel tires 7. As a power receiving unit, a power receiving coil unit 9 is provided to a part of a vehicle bottom surface which is almost in the middle between the left and right rear-wheel tires 7. The power receiving coil unit 9 includes a vehicle-side coil 11, and wirelessly receives the power from the power transmission equipment 3 via a power transmission coil unit 15 including a ground-side coil 13, which will be described later.

Figure 2:
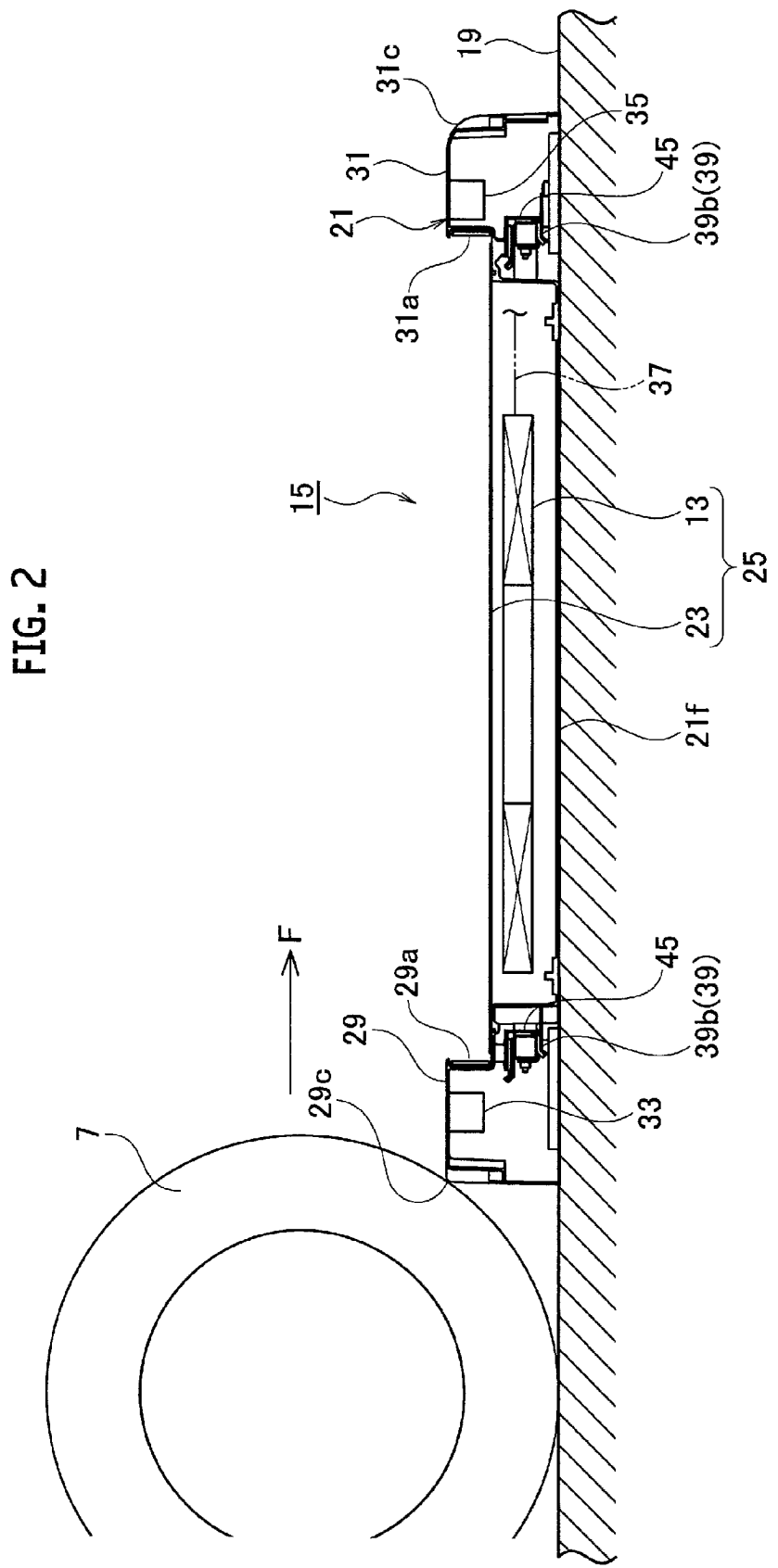
FIG. 2 is a cross-sectional view showing a state where a tire of the electric vehicle shown in FIG. 1 is in touch with a front-side projection of a housing of a power transmission coil unit.

The power transmission equipment 3 includes: a power source unit 17; and the power transmission coil unit 15, as a power transmission unit, configured to supply radio-frequency power from the power source unit 17 to the power receiving coil unit 9. As shown in FIG. 2, the power transmission coil unit 15 includes a metal-made housing 21 set on a ground 19. The ground-side coil 13 shaped like a cylinder is housed in the housing 21.

Figure 3:
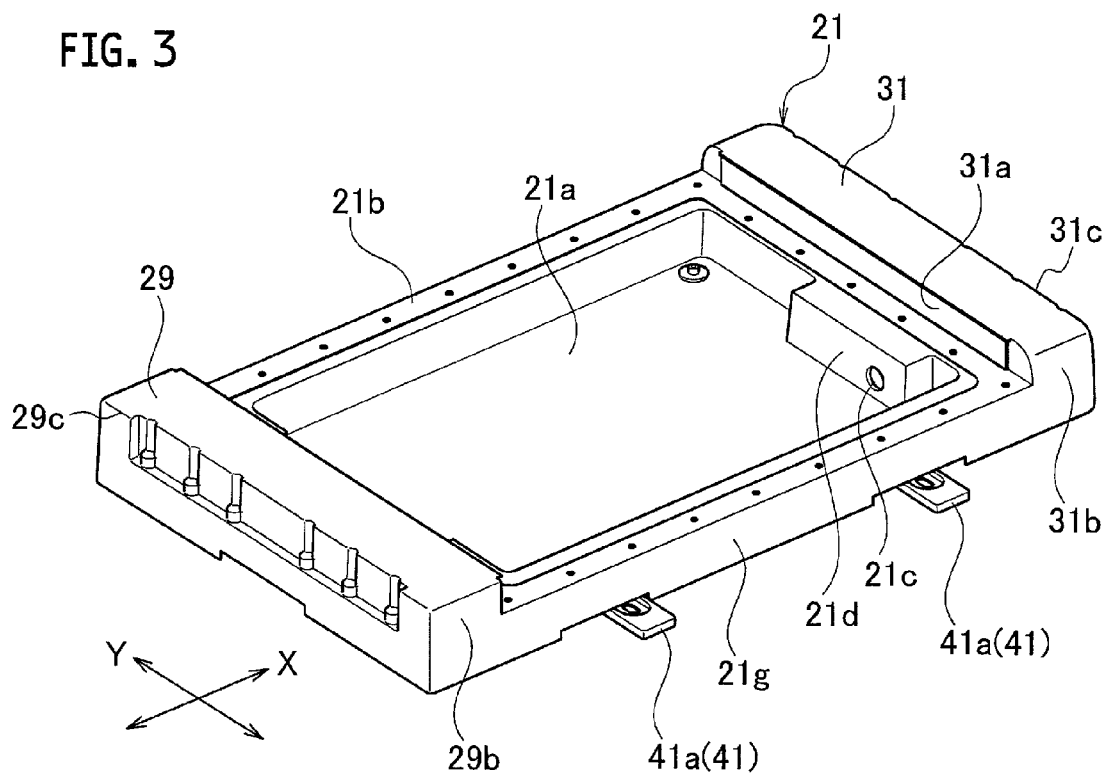
FIG. 3 is a perspective view showing the housing of the power transmission coil unit shown in FIGS. 1 and 2 with a cover and a ground-side coil detached from the housing.

As shown in FIG. 3, the housing 21 is shaped like a rectangle in a plan view. An upper surface of the housing 21 is provided with a recessed portion 21a set back downward. The ground-side coil 13 housed in the recessed portion 21a is fixed to the housing 21 with attachment fasteners, albeit not illustrated, as needed. Hereinbelow, the long side direction of the housing 21 is referred to as an X direction, while the short side direction of the housing 21 which is orthogonal to the X direction is referred to as a Y direction. It should be noted that as shown in FIG. 3, a length of the housing 21 in the X direction is set longer than a length of the housing 21 in the Y direction.

Figure 4:
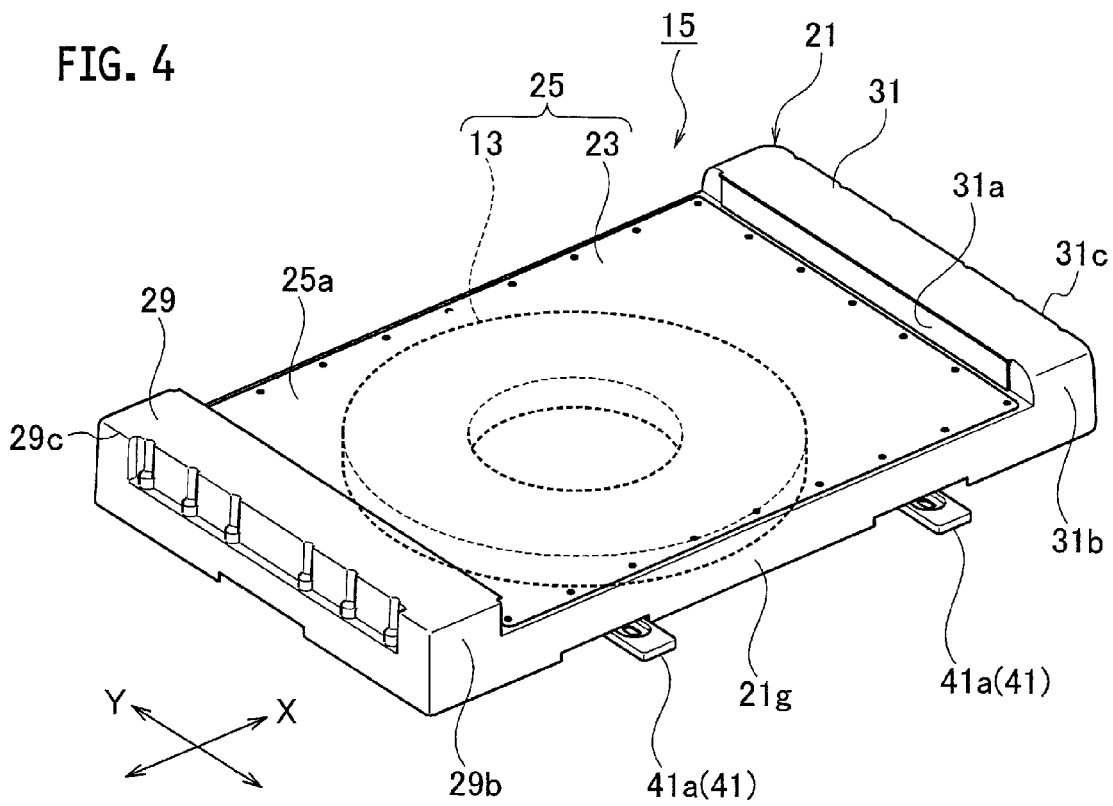
FIG. 4 is a perspective view showing the housing of the power transmission coil unit shown in FIG. 3 with the ground-side coil housed in the housing, and with the cover attached to the housing.

As shown in FIG. 4, an upper opening of the recessed portion 21*a* is covered with and closed by a cover 23 made of a resin-made plate-shaped member. In a state of being put on a fixing surface 21*b* around the recessed portion 21*a* shown in FIG. 3, the cover 23 is fixed to the housing 21. It is desirable that the cover 23 located above the ground-side coil 13 be made of a non-conducting material lest the cover 23 should be heated by magnetic flux which is produced when the ground-side coil 13 is excited. An area of the housing 21 in which the ground-side coil 13 and the resin-made cover 23 of the embodiment are installed forms a coil section 25 of the power transmission coil unit 15.

The housing 21 has a front-side projection 29, as a first projection, in its one end portion which is closer to a vehicle entry side (the side from which a first portion in the housing 21 goes into an area right under the power receiving coil unit 9 while the electric vehicle 1 is moving to the power receiving position, or the left side in FIG. 1) (hereinafter referred to as a front side as well) than the coil section 25 is. The front-side projection 29 projects upward from an upper surface 25*a* of the coil section 25, and is formed extending across the full length (the full width) of the housing 21 in the Y direction. As shown in FIGS. 2 to 4, the front-side projection 29 is shaped like a rectangular parallelepiped, which extends long in the Y direction.

The housing 21 further has a rear-side projection 31, as a second projection, in its other end portion which is on an opposite side of the coil section 25 from the front-side projection 29 in a vehicle entry direction F. In other words, a positional relationship between the front-side projection 29 and the rear-side projection 31 makes the two projections opposite each other in the X direction with the coil section 25 interposed in between. Like the front-side projection 29, the rear-side projection 31 projects upward from the upper surface 25*a* of the coil section 25, and is formed extending across the full length (the full width) in the Y direction of the housing 21. As shown in FIGS. 2 to 4, the rear-side projection 31 is also shaped like a rectangular parallelepiped, which extends long in the Y direction.

As shown in FIG. 2, the front-side projection 29 houses an infrared signal transmitter 33 as a transmitter of a foreign object detection signal S for detecting a foreign object. In addition, the rear-side projection 31 houses an infrared signal receiver 35 as a receiver configured to receive the foreign object detection signal S transmitted from the infrared signal transmitter 33. The front-side projection 29 and the rear-side projection 31 respectively include a signal output window 29*a* and a signal input window 31*a* which are opposite each other in the X direction. The foreign object detection signal S transmitted from the infrared signal transmitter 33 through the signal output window 29*a* is designed to be received by the infrared signal receiver 35 through the signal input window 31*a*.

As shown in FIG. 2, a lead cable 37 of the ground-side coil 13 to the outside is laid out from the ground-side coil 13 in the vehicle entry direction F (rightward in FIG. 2) inside the recessed portion 21*a* shown in FIG. 3, and is drawn through an inner drawing hole 21*c* into a space inside the rear-side projection 31. An extending portion 21*d* extending toward the inside of the recessed portion 21*a* (toward the front-side projection 29) is provided at a position near one side of the housing 21 in the Y direction (a front side of the sheet of FIG. 2). The inner drawing hole 21*c* is made in the extending portion 21*d*.

The lead cable 37 drawn into the rear-side projection 31 is drawn to the outside of the housing 21 through an outer drawing hole formed in an outer wall surface of the rear-side projection 31, which is a right one of the wall surfaces of the rear-side projection 31 in FIG. 2. The lead cable 37 drawn to the outside of the housing 21 is connected to the power source unit 17.

As shown in FIG. 2, the housing 21 is fixed to the ground 19 using a frame 39 (see FIG. 5), which will be described later, with a lower surface 21*f* of the housing 21 placed on the ground 19. The housing 21 in the state of being fixed to the ground 19 has sidewalls 21*g*, which extend almost perpendicular to the ground 19 and in the X direction, on the two respective side surfaces of the housing 21 in the Y direction (the two respective sides orthogonal to the sheet in FIG. 2). The sidewalls 21*g* include side walls 29*b* of the front-side projection 29, and side walls 31*b* of the rear-side projection 31, respectively.

Figure 5:
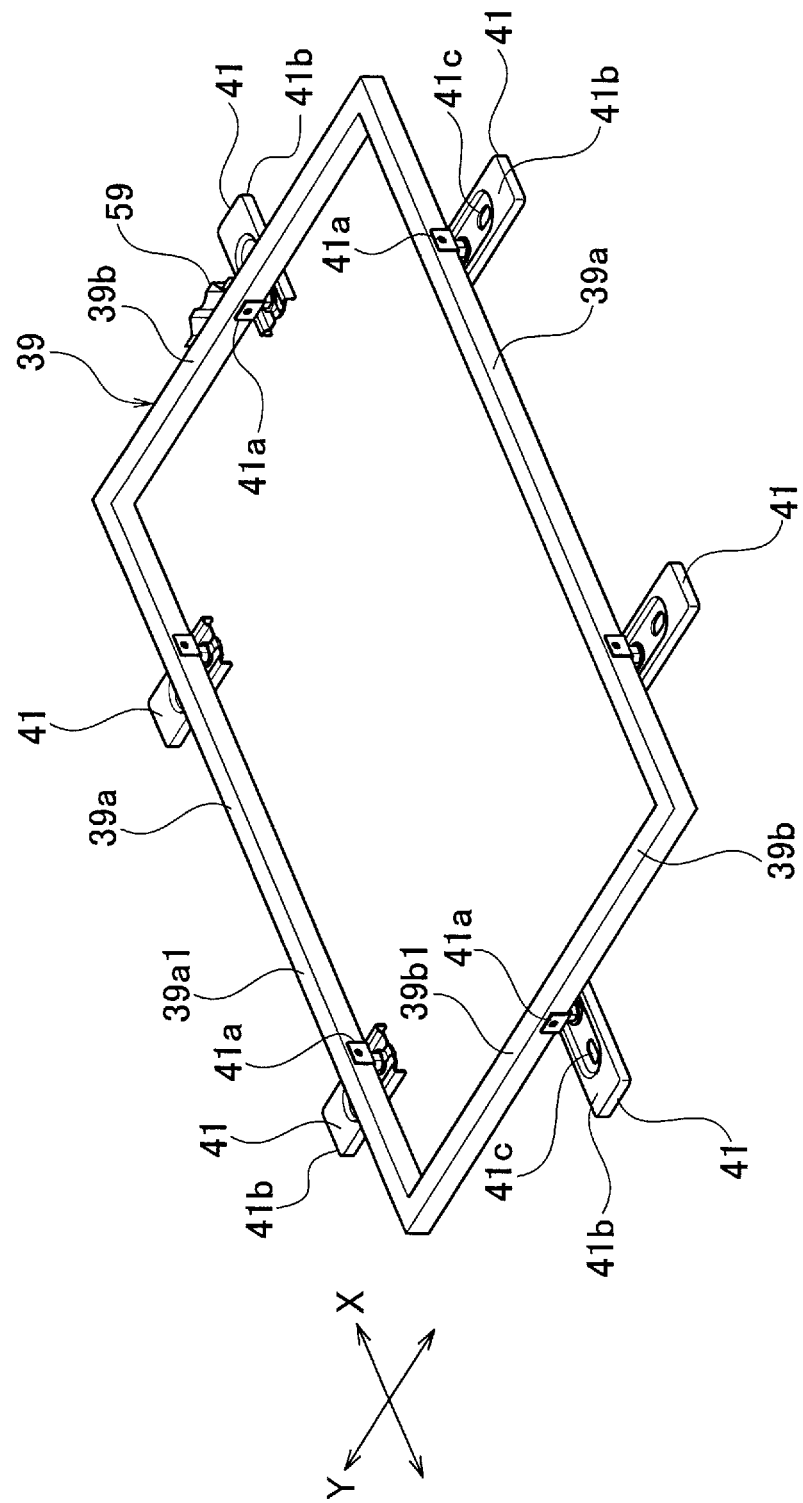
FIG. 5 is a perspective view of a frame on which to mount the housing of the power transmission coil unit shown in FIG. 4.

As shown in FIG. 5, an external form of the frame 39 is shaped like almost the same rectangular frame as that of the housing 21 is. The frame 39 includes: a pair of long side portions 39*a* extending in the X direction, and in parallel with each other, with the cross sections of the long side portions 39*a* shaped like a rectangle; and a pair of short side portions 39*b* extending in the Y direction, and in parallel with each other, with the cross sections of the short side portions 39*b* shaped like a rectangle. Two brackets 41 with which to fix the frame 39 to the ground 19 are attached to each long side portion 39*a*, while one bracket 41 is attached to each short side portion 39*b*.

Each bracket 41 attached to the corresponding long side portion 39*a* includes: a frame supporting portion 41*a* having a cross section shaped almost like the letter U, and configured to support the long side portion 39*a* in a way that the long side portion 39*a* is held between the two sides of the frame supporting portion 41*a* in the widthwise direction of the long side portion 39*a*; and a plate-shaped fixing portion 41*b* connecting to the lower portion of the frame supporting portion 41*a*, projecting toward the outside of the frame 39, and configured to be fixed to the ground 19. Each frame supporting portion 41*a* is fixed to the frame 39 by: inserting a bolt B into the frame supporting portion 41*a* from one side in the X direction in a way that the bolt B penetrates through the frame 39; and fastening a nut N to the bolt B on the opposite side thereof. A bolt insertion hole 41*c* is formed in the fixing portion 41*b*. A bolt, albeit not illustrated, is inserted through the bolt insertion hole 41*c*, and is fastened to a nut buried in the ground 19. Otherwise, a stud bolt whose part is buried in the ground 19 is inserted through the bolt insertion hole 41*c*, and a nut is fastened to the stud bolt from above the fixing portion 41*b*.

Figure 6:
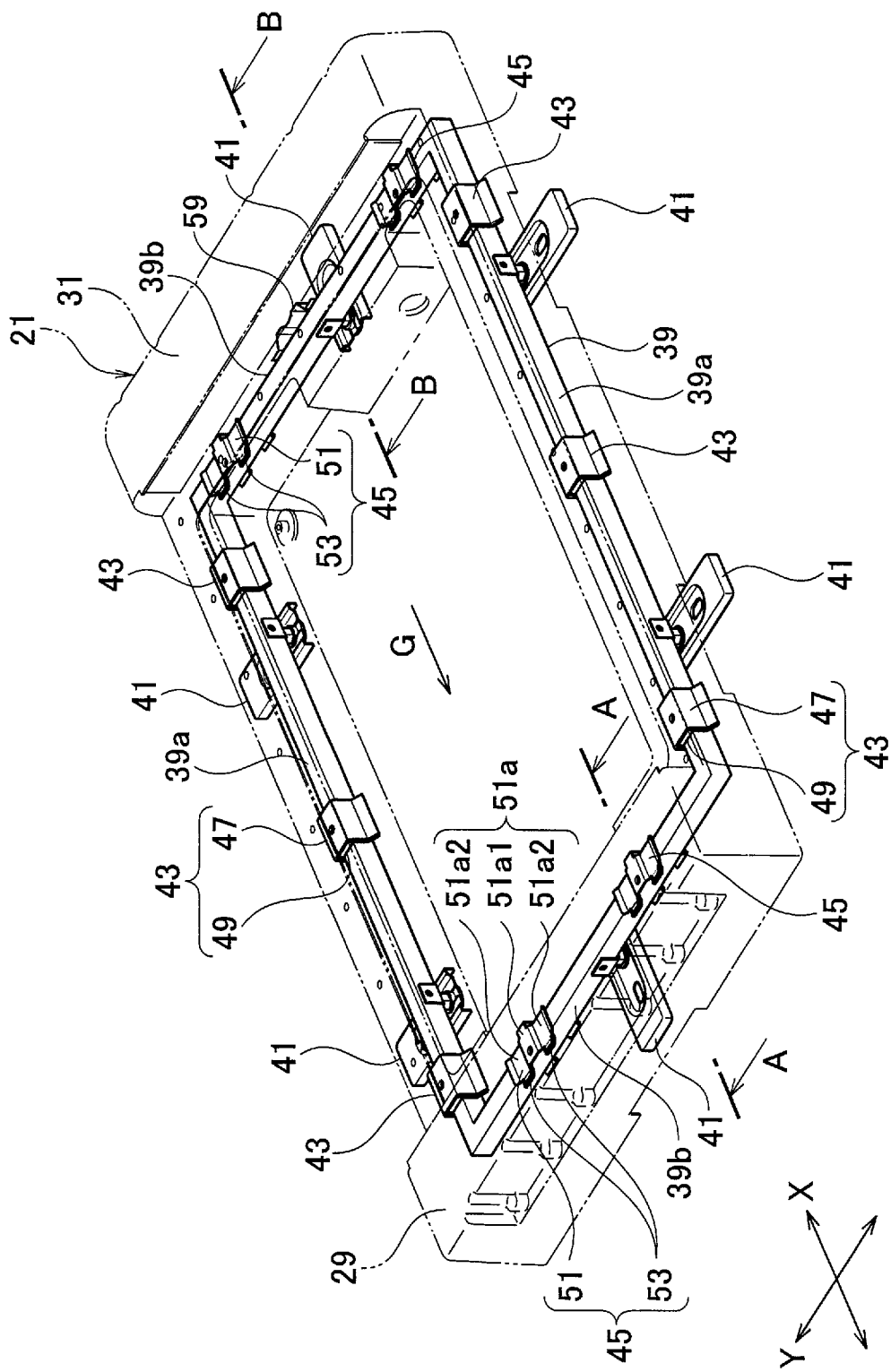
FIG. 6 is a perspective view showing where sliders attached to the housing of the power transmission coil unit are located in relation to the frame shown in FIG. 5.

Sliders 43, 45 are attached to the back side of the housing 21. The sliders 43, 45 are configured to make the housing 21 slide over the frame 39 in a direction (a slide direction G in FIG. 6) opposite to the vehicle entry direction F shown in FIGS. 1 and 2, and to thereby mount the housing 21 on the frame 39. FIG. 6 shows where the sliders 43, 45 attached to the housing 21 are located in relation to the frame 39. In other words, the sliders 43, 45 attached to the housing 21 are movable in relation to the frame 39 in the slide direction G, and in the direction F opposite to the slide direction G.

Three of the sliders 43 are attached respectively to positions on the housing 21 which correspond to each long side portion 39a, and two of the sliders 45 are attached respectively to positions on the housing 21 which correspond to each short side portion 39b.

The sliders 43 attached to the respective positions on the housing 21 which correspond to each long side portion 39a each include: a metal-made outer shell portion 47 forming an outer shell; and a resin-made guide body 49 provided to an inner surface of the outer shell portion 47, and configured to slide over the long side portion 39a. The outer shell portion 47 is shaped almost like the letter U in a way that the outer shell portion 47 covers the upper surface and the two side surfaces of the long side portion 39a. In response to this, the guide body 49 is also shaped almost like the letter U. The lower ends of the two respective side surfaces of each of the outer shell portion 47 and the guide body 49 extend outward in a way that the lower ends thereof are away from each other. The guide body 49 whose cross section is shaped almost like the letter U is fitted onto the long side portion 39a in a way that the guide body 49 covers the long side portion 39a from above the long side portion 39a. The guide body 49 slides over the upper surface and the two side surfaces of the long side portion 39a. Each slider 43 is fixed to the housing 21 in a way that the upper surface of the outer shell portion 47 faces the housing 21.

Figure 7:
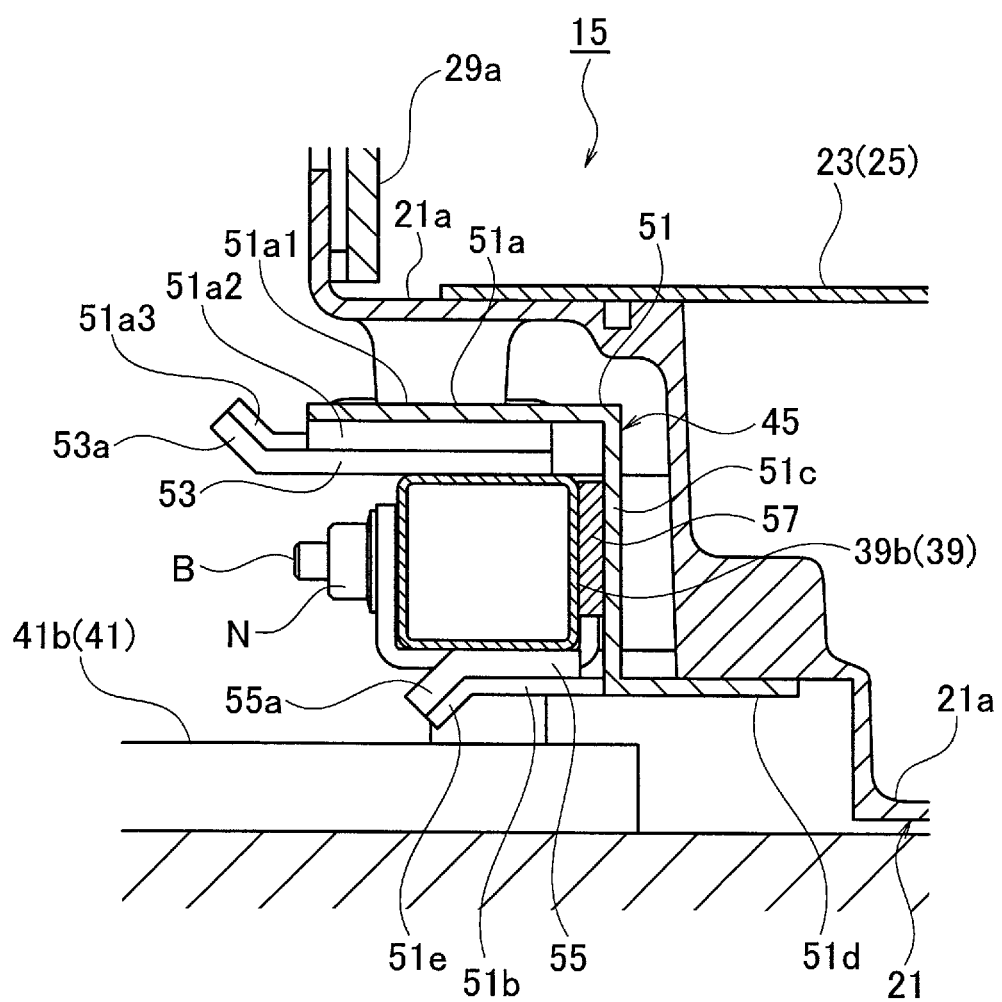
FIG. 7 is a cross-sectional view taken along the A-A line of FIG. 6, and shows how the housing of the power transmission coil unit is mounted on the frame.

On the other hand, the sliders 45 attached to the positions on the housing 21 which correspond to each short side portion 39b each include: a metal-made outer shell portion 51 forming an outer shell; and resin-made guide bodies 53, 55 provided to the respective upper and lower inner surfaces of the outer shell portion 51, and configured to slide over the short side portion 39b (see FIG. 7). As shown in FIG. 7, the outer shell portion 51 includes: upper and lower surface portions 51a, 51b located corresponding to the upper and lower surfaces of the long side portion 39a; and a rear surface portion 51c connecting the end portions of the respective upper and lower surface portions 51a, 51b which are directed in an opposite direction to the slide direction G (rightward in FIG. 7).

The length of the upper surface portion 51a extending leftward from the rear surface portion 51c in FIG. 7 (the length from the rear surface portion 51c to the tip end of the upper surface portion 51a) is set longer than the length of the lower surface portion 51b extending in the same direction from the rear surface portion 51c (the length from the rear surface portion 51c to the tip end of the lower surface portion 51b). In addition, while the housing 21 is in the state of being mounted on the frame 39, the upper surface portion 51a projects forward (leftward in FIG. 7) beyond the short side portions 39b, while the lower surface portion 51b does not project forward beyond the short side portions 39b. In addition, the outer shell portion 51 further has a rearward extending portion 51d, which is located flush with the lower surface portion 51b, in its portion which is on an opposite side of the rear surface portion 51c from the lower surface portion 51b, that is to say, on the right side of the rear surface portion 51c in FIG. 7.

As shown in FIG. 6, the upper surface portion 51a has an upward projecting projection 51a1 at its middle position in the Y direction. The slider 45 is fixed to the housing 21 with the assistance of the upper surface of the projection 51a1 and the rearward extending portion 51d. The guide bodies 53 configured to slide over the upper surface of the short side portions 39b are attached to the lower surfaces of the flat portions 51a2 located on the two sides of the projection 51a1 in the Y direction, respectively. The flat portions 51a2 project forward (leftward in FIG. 8) beyond the projection 51a1. A tip end portion of each flat portion 51a2 forms an upper bent portion 51a3 which is bent obliquely forward and upward. A tip end portion of each guide body 53 also forms an upper bent portion 53a which is bent obliquely forward and upward in relation to the corresponding flat portion 51a2.

On the other hand, the guide body 55 configured to slide over the lower surface of the short side portion 39b is attached to the upper surface of the lower surface portion 51b. A tip end portion of the lower surface portion 51b forms a downward bent portion 51e which is bent obliquely forward and downward. A tip end portion of the guide body 55 also forms a downward bent portion 55a which is bent obliquely forward and downward.

In addition, as shown in FIG. 7, resin-made stopper members 57 are provided at positions on the rear surface portions 51c of the outer shell portions 51 which are opposite the short side portions 39b. When the housing 21 is mounted on the frame 39, the housing 21 is slidingly moved in the slide direction G, and the stopper members 57 comes into contact with the short side portions 39b of the frame 39. Thereby, the housing 21 is positioned to the frame 39.

As shown in FIGS. 5 and 6, of the pair of short side portions 39b of the frame 39, the short side portion 39b located on the opposite side in the slide direction G is provided with a lock jig 59 formed from a leaf spring-like member which is attached to a surface of the short side portion 39b on the opposite side in the slide direction G. The lock jig 59 includes: a pair of flange portions 59a fixed to the short side portion 39b; and a lock portion 59b raised from the flange portions 59a rearward, namely in a direction opposite to the slide direction G, and shaped like the letter U in the plan view. The lock portion 59b is provided with a lock hole 59c. The lock hole 59c is an elongate hole which is longer in an extending installation direction of the short side portions 39b (in the Y direction).

Figure 8:
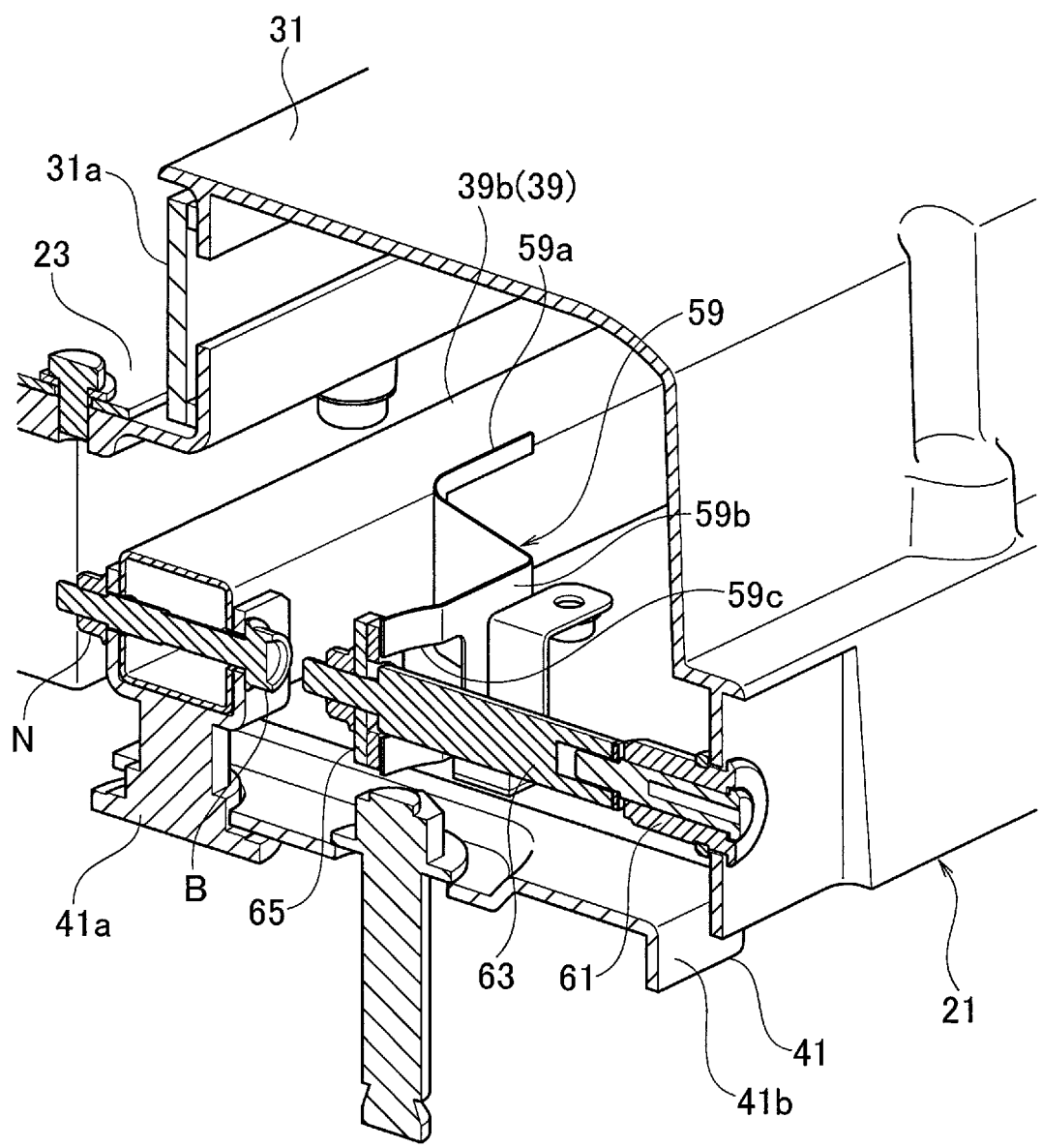
FIG. 8 is a perspective view of a cross section taken along the B-B line of FIG. 6, and shows how the housing of the power transmission coil unit is mounted on the frame.

On the other hand, as shown in FIG. 8, a key cylinder 61 is installed in a part of the rear-side projection 31 of the housing 21 which corresponds to the lock jig 59. The key cylinder 61 is installed in a lower portion of an outer side wall surface of the rear-side projection 31 of the housing 21.

The key cylinder 61 includes an extending portion 63 which projects toward the lock jig 59 in an inner space of the rear-side projection 31. A tip end portion of the extending portion 63 is inserted through the lock hole 59c, and projects forward of the lock hole 59c. A lock piece 65 is attached to the tip end portion of the extending portion 63 which projects forward of the lock hole 59c.

The lock piece 65 is formed from a rod-shaped member, which extends in a direction orthogonal to an extending installation direction of the extending portion 63. In addition, the lock piece 65 is set shorter than the length of the elongate hole-shaped lock hole 59c in its longitudinal direction, and is set longer than a dimension of the elongate hole-shaped lock hole 59c in its short-side direction. For this reason, when a key, albeit not illustrated, is turned after inserted into the key cylinder 61 from outside the housing 21, the lock piece 65 is turned together with the extending portion 63. Thereby, the lock piece 65 can be displaced to a locked condition shown in FIG. 8, and to an unlocked condition where the lock piece 65 turns 90 degrees from the locked condition shown in FIG. 8.

Next, descriptions will be provided for how the power transmission coil unit 15 shown in FIG. 2 is mounted onto the frame 39 shown in FIG. 5. The frame 39 shown in shown in FIG. 5 is fixed to the ground 19 using the brackets 41. The power transmission coil unit 15 is set onto the frame 39 in a way that the power transmission coil unit 15 covers the frame 39 from above. To this end, the power transmission coil unit 15 is set at a position which is slightly offset from a specified mounting position at which to mount the power transmission coil unit 15 onto the frame 39 in the direction opposite to the slide direction G.

Figure 9:
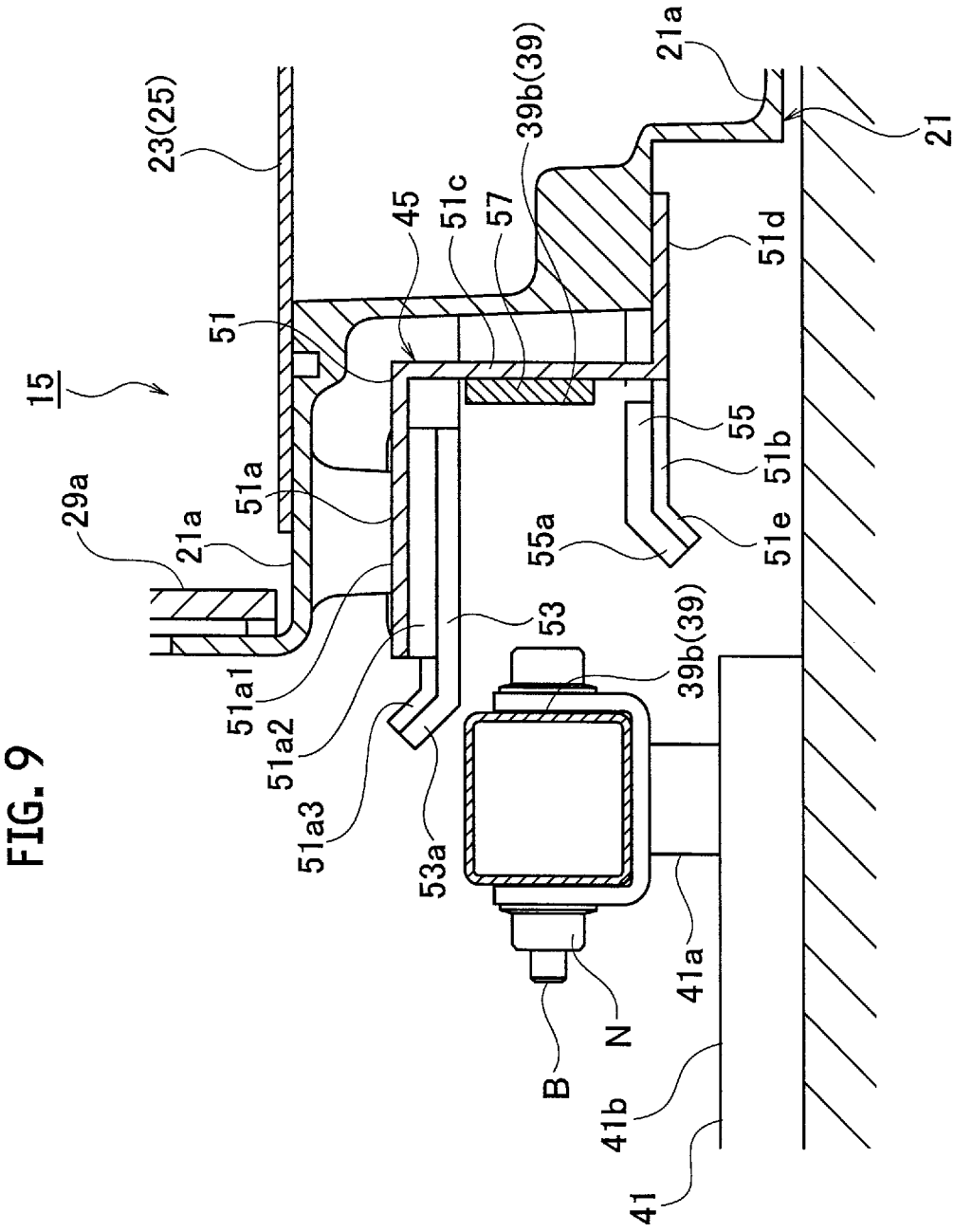
FIG. 9 is a cross-sectional view taken along the A-A line of FIG. 6, and shows how the housing of the power transmission coil unit is temporarily placed on the frame.

FIG. 7 shows the specified mounting position at which to mount the power transmission coil unit 15 onto the frame 39. First of all, the power transmission coil unit 15 (the housing 21) is set at a position offset rightward in FIG. 7 from the specified mounting position in FIG. 7. In other words, the housing 21 is temporarily placed in relation to the short side portion 39b of the frame 39 at a temporary placement position in which the slider 45 is offset in the direction opposite to the slide direction namely rightward in FIG. 7, from the specified mounting position shown in FIG. 7. When the housing 21 is at the temporary placement position, a left tip end of the downward bent portion 55a of the guide body 55 under the slider 45 shown in FIG. 7 is located rightward in FIG. 9 of the short side portion 39b of the frame 39, as shown in FIG. 9. In addition, when the housing 21 is at the temporary placement position, the guide body 53 may be on the short side portion 39b, or does not have to be on the short side portion 39b with the guide body 53 located rightward of the short side portion 39b in FIG. 7.

While the housing 21 is in the state of being temporarily placed in relation to the frame 39, all the two sliders 45 provided to each of the two short side portions 39b, namely all the four sliders 45 in total, are put in the same state described above. In addition, when the housing 21 is at the temporary placement position, all the three sliders 43 provided to each of the two long side portions 39a, namely all the six sliders 43 in total, are placed on the long side portions 39a at positions which are offset in the direction opposite to the slide direction G, namely rightward in FIG. 6, from their respective specified mounting positions shown in FIG. 6. The upper surfaces 39a1, 39b1 of parts of the frame 39 (39a, 39b) on which the guide bodies 49, 53 are placed form temporary placement portions.

When the housing 21 is moved in relation to the frame 39 in the slide direction G starting from the temporary placement state shown in FIG. 9, the resin-made guide bodies 49 of the sliders 43 slidingly move while sliding over the frame 39 (the long side portions 39a), and the resin-made guide bodies 53, 55 of the sliders 45 slidingly move while sliding toward the frame 39 (the short side portions 39b). As a result, as shown in FIG. 7, the stopper member 57 of each slider 45 comes into contact with the side surface of the corresponding short side portion 39b. Thereby, the housing 21 is positioned to the frame 39.

Since the upper and lower guide bodies 53, 55 of each slider 45 respectively have the upper bent portions 53a and the downward bent portions 55a in their tip ends, and since the tip end-side opening of each slider 45 is greater than the vertical widthwise dimension of the frame 39 (the corresponding short side portions 39b), the frame 39 easily enters the space between the upper and lower guide bodies 53, 55 when the housing 21 is positioned to the frame 39.

In this respect, when the power transmission coil unit 15 is slidingly moved starting from the temporary placement state shown in FIG. 9, the key cylinder 61 shown in FIG. 8 is in the unlocked condition, that is to say, in a condition where the key cylinder 61 turns 90 degrees from the locked condition shown in FIG. 8. For this reason, the rod-shaped lock piece 65 at the tip end of the extending portion 63 of the key cylinder 61 is in the unlocked condition in where the lock piece 65 is directed in the horizontal direction, is penetrated through the lock hole 59c which is the elongate hole, and is located forward of the lock portion 59b.

Furthermore, when the manipulation of the key from outside makes the key cylinder 61 turn 90 degrees from the unlocked condition, the key cylinder 61 is brought into the locked condition shown in FIG. 8. While the key cylinder 61 is in the locked condition, the rod-shaped lock piece 65 is in a state of being directed in the vertical direction as shown in FIG. 8, and both the upper and lower end portions of the lock piece 65 are in engagement with both the upper and lower peripheral edges of the lock hole 59c, respectively. Thereby, the mounting of the power transmission coil unit 15 onto the frame 39 is completed.

Next, descriptions will be provided for how charging work of charging the battery installed in the electric vehicle 1 is performed using the power transmission equipment 3 including the power transmission coil unit 15. The electric vehicle 1 is moved, for example, from the position indicated with the solid line shown in FIG. 1 to the power transmission equipment 3 in the vehicle entry direction F, and is stopped at the power receiving position indicated with the chain double-dashed line in FIG. 1. While the electric vehicle 1 is in the power receiving position, the power transmission coil unit 15 is located almost right under the power receiving coil unit 9 installed in the electric vehicle 1, as well as the vehicle-side coil 11 and the ground-side coil 13 are in a positional relationship in which the vehicle-side coil 11 and the ground-side coil 13 are opposite each other.

While in this state, the supply of the radio-frequency power from the power source unit 17 to the power transmission coil unit 15 makes it possible to wirelessly supply the power from the power transmission coil unit 15 to the power receiving coil unit 9, and thereby to charge the battery of the electric vehicle 1. At this time, as shown in FIG. 1, the left and right rear-wheel tires 7 of the electric vehicle 1 are located at positions which are almost left-right symmetric with respect to the power transmission coil unit 15.

In contrast to this, let us assume a case where when the electric vehicle 1 is moved into the power transmission equipment 3, the position of the electric vehicle 1 is displaced, by mistake, in the left-right direction (the upward-downward direction in FIG. 1) from the power receiving position indicated with the chain double-dashed line in FIG. 1 to a large extent. In this case, as shown in FIG. 2, either the left or right rear-wheel tire 7 is likely to come into touch with the power transmission coil unit 15 after moving toward the power transmission coil unit 15.

In this case, the rear-wheel tire 7 comes into touch with the front-side projection 29 provided to the housing 21 of the power transmission coil unit 15. Meanwhile, since the front-side projection 29 projects upward from the upper surface 25a of the coil section 25, the height of the front-side projection 29 from the ground 19 is sufficiently high. For this reason, once the rear-wheel tire 7 comes into touch with the front-side projection 29, the front-side projection 29 performs a function as a tire stopper, and the driver stops the electric vehicle 1 from further moving in the vehicle entry direction F. Thereby, it is possible to inhibit the rear-wheel tire 7 from running onto the power transmission coil unit 15, particularly to inhibit the rear-wheel tire 7 from running onto the coil section 25 including the resin-made cover 23, and accordingly to inhibit damage to the coil section 25.

Furthermore, even if the rear-wheel tire 7 runs onto the front-side projection 29, the driver can instantaneously judge that the rear-wheel tire 7 runs onto the front-side projection 29. The driver, therefore, stops the electric vehicle 1 from further moving in the vehicle entry direction F by operating the brake quickly. Thus, it is possible to inhibit the rear-wheel tire 7 from running onto the coil section 25, and to inhibit damage to the coil section 25 including the resin-made cover 23.

In the embodiment, moreover, the housing 21 has the rear-side projection 31, which projects upward from the upper surface 25a of the coil section 25, at the position opposite the front-side projection 29 with the coil section 25, which includes the ground-side coil 13, interposed between the position and the front-side projection 29 (at the position on the opposite side of the coil section 25 in the vehicle entry direction). In addition, one of the front-side projection 29 and the rear-side projection 31 includes the infrared signal transmitter 33 configured to transmit the foreign object detection signal for detecting a foreign object on the coil section 25, while the other thereof includes the infrared signal receiver 35 configured to receive the foreign object detection signal transmitted from the infrared signal transmitter 33.

In this case, if a foreign object is put on the coil section 25, the foreign object is detected with the infrared signal transmitted from the infrared signal transmitter 33, and a monitor provided to the power transmission equipment 3, for example, displays a warning that the battery charging operation cannot be performed.

To this end, the embodiment installs the infrared signal transmitter 33 and the infrared signal receiver 35 in the front-side projection 29 and the rear-side projection 31. In other words, the embodiment effectively uses the front-side projection 29 by installing the foreign object detection sensor in the front-side projection 29 designed to function as the tire stopper.

In addition, the embodiment makes the housing 21 includes the sidewalls 21g extending in the vehicle entry direction F. For this reason, even if while as shown in FIG. 1, the electric vehicle 1 is being moved into the power transmission equipment 3, either the left or right rear-wheel tire 7 sideward comes into touch with the housing 21 as a result of wrong steering manipulation by the driver after the rear-wheel tire 7 passes over the front-side projection 29, the rear-wheel tire 7 comes into touch with the corresponding one of the sidewalls 21g. This enables the driver to notice the touch, and to stop the electric vehicle 1 from further moving in the vehicle entry direction F. In other words, the two sidewalls 21g of the housing 21 function as tire guides. Thereby, it is possible to inhibit the rear-wheel tire 7 from running onto the power transmission coil unit 15, particularly to inhibit the rear-wheel tire 7 from running onto the coil section 25 including the resin-made cover 23, and accordingly to inhibit damage to the coil section 25.

Besides, the embodiment makes the front-side projection 29 include a run-onto blocking portion formed in a shape which makes it harder for the rear-wheel tire 7 of the electric vehicle 1 to run onto the front-side projection 29 than the rear-side projection 31. The run-onto blocking portion can be formed by making the upward projection height of the front-side projection 29 higher than the upward projection height of the rear-side projection 31. This makes it harder for the rear-wheel tire 7 to run onto the higher front-side projection 29 after the driver brings the rear-wheel tire 7 into touch with the front-side projection 29. Accordingly, it is possible to more securely inhibit the rear-wheel tire 7 from running onto the front-side projection 29.

The run-onto blocking portion of the front-side projection 29 can be formed, too, by making a radius of curvature of an upper end corner portion 29c of the front-side projection 29 on the vehicle entry side smaller than a radius of curvature of an upper end corner portion 31c of the rear-side projection 31 which is on the opposite side of the rear-side projection 31 from the front-side projection 29. In FIG. 2, the upper end corner portion 29c of the front-side projection 29 on the vehicle entry side is formed in an angled shape having almost no curve, while the upper end corner portion 31c of the rear-side projection 31 is shaped like a relatively large curved surface. This makes it harder for the rear-wheel tire 7 to run onto the front-side projection 29, which includes the upper end corner portion 29c formed in the angled shape, after the driver brings the rear-wheel tire 7 into touch with the front-side projection 29. Accordingly, it is possible to more securely inhibit the rear-wheel tire 7 from running onto the front-side projection 29.

Although the foregoing descriptions have been provided for the embodiments of the present invention, these embodiments are shown merely as the examples which are described for the purpose of making the present invention easy to understand. The present invention is not limited to the embodiments. The technical scope of the present invention is not limited to the concrete technical matters disclosed in the embodiments, and includes various modifications, changes, alternative techniques and the like which can be easily derived from the concrete technical matters.

For example, in the foregoing embodiments, all the cover 23 of the coil section 25 is made of resin. Instead, only a circular part of the cover 23 which almost corresponds to the circular ground-side coil 13 in the plan view may be made of resin, while the periphery of the resin-made circular part of the cover 23 may be formed from a metal plate. In other words, instead of, as shown in FIG. 4, forming all the cover 23 from the single resin-made cover 23, only the part of the cover 23 which covers the upper portion of the ground-side coil 13 may be made of resin, while the periphery of the resin-made part of the cover 23 may be made of metal.

This application claims the right of priority based on Japanese Patent Application No. 2013-071225 filed on Mar. 29, 2013, and all the contents of Japanese Patent Application No. 2013-071225 are incorporated herein.

INDUSTRIAL APPLICABILITY

According to the present invention, if one of the tires of the electric vehicle comes into tough with the projection of the housing while the vehicle is being moved into the power transmission equipment with the vehicle directed toward the power transmission unit, the rider of the vehicle can notice a situation in which the tire is about to run onto the housing of the power transmission unit. Accordingly, it is possible to inhibit the tire of the vehicle from running onto the coil section of the power transmission unit.

REFERENCE SIGNS LIST 7 rear-wheel tire (tire)
9 power receiving coil unit (power receiving unit)
11 vehicle-side coil
13 ground-side coil
15 power transmission coil unit (power transmission unit)
19 ground
21 housing of power transmission coil unit
21g sidewall of housing
25 coil section
25a surface of coil section
29 front-side projection (first projection, run-onto blocking portion, projection) of housing 29c upper end corner portion of front-side projection on vehicle entry side
31 rear-side projection (second projection) of housing
31c upper end corner portion of rear-side projection on opposite side of rear-side projection from front-side projection
33 infrared signal transmitter (transmitter)
35 infrared signal receiver (receiver)

The invention claimed is:

1. A power supply device comprising:
a power receiving unit including a vehicle-side coil, the power receiving unit being mounted on a vehicle; and
a power transmission unit configured to wirelessly supply power to the power receiving unit, wherein
the power transmission unit includes
a ground-side coil, and
a housing set on a ground and configured to house the ground-side coil, and
the housing includes
a cover located above the ground-side coil and made of a non-conducting material, and
a first projection disposed closer to a vehicle entry side than the cover is, and projecting upward from a surface of the cover,
wherein the power transmission unit is configured to wirelessly supply power to the power receiving unit when the housing is located at a position with respect to which a pair of tires of the vehicle are left-right symmetric, and
wherein the first projection includes a run-onto blocking portion configured to prevent a tire of the vehicle from running onto the cover.

2. The power supply device according to claim 1, wherein
the housing includes a second projection, which projects upward from the surface of the cover, at a position opposite the first projection with the cover interposed in between,
one of the first and second projections includes a transmitter of a foreign object detection signal for detecting a foreign object on the cover, and
the other of the first and second projections includes a receiver configured to receive the foreign object detection signal transmitted from the transmitter.

3. The power supply device according to claim 2, wherein the run-onto blocking portion is formed in a shape which makes it harder for the tire of the vehicle to run onto the first projection than the second projection.

4. The power supply device according to claim 3, wherein the run-onto blocking portion is formed by making an upward projection height of the first projection higher than an upward projection height of the second projection.

5. The power supply device according to claim 3, wherein the run-onto blocking portion is formed by making a radius of curvature of an upper end corner portion of the first projection on the vehicle entry side smaller than a radius of curvature of an upper end corner portion of the second projection on an opposite side from the first projection.

6. The power supply device according to claim 1, wherein the housing includes a sidewall extending in a vehicle entry direction.

7. A power transmission unit for a power supply device configured to wirelessly supply power to a power receiving unit including a vehicle-side coil, the power receiving unit being mounted on a vehicle, comprising:
a ground-side coil, and
a housing set on a ground and configured to house the ground-side coil, wherein the housing includes
a cover located above the ground-side coil and made of a non-conducting material, and
a projection disposed closer to a vehicle entry side than the cover is, and projecting upward from a surface of the cover,
wherein the power transmission unit is configured to wirelessly supply power to the power receiving unit when the housing is located at a position with respect to which a pair of tires of the vehicle are left-right symmetric, and
wherein the projection includes a run-onto blocking portion configured to prevent a tire of the vehicle from running onto the cover.

8. A power supply device comprising:
a power receiving unit including a vehicle-side coil; and
a power transmission unit configured to wirelessly supply power to the power receiving unit, wherein
the power transmission unit includes
a ground-side coil, and
a housing set on a ground and configured to house the ground-side coil, and
the housing includes
a cover located above the ground-side coil and made of a non-conducting material, and
a first projection disposed closer to a vehicle entry side than the cover is, and projecting upward from a surface of the cover,
the housing includes a second projection, which projects upward from the surface of the cover, at a position opposite the first projection with the cover interposed in between,
one of the first and second projections includes a transmitter of a foreign object detection signal for detecting a foreign object on the cover, and
the other of the first and second projections includes a receiver configured to receive the foreign object detection signal transmitted from the transmitter.

9. The power supply device according to claim 8, wherein the first projection includes a run-onto blocking portion formed in a shape which makes it harder for a tire of a vehicle to run onto the first projection than the second projection.

10. The power supply device according to claim 9, wherein the run-onto blocking portion is formed by making an upward projection height of the first projection higher than an upward projection height of the second projection.

11. The power supply device according to claim 9, wherein the run-onto blocking portion is formed by making a radius of curvature of an upper end corner portion of the first projection on the vehicle entry side smaller than a radius of curvature of an upper end corner portion of the second projection on an opposite side from the first projection.

* * * * *